United States Patent
Gillam et al.

(10) Patent No.: US 9,120,510 B1
(45) Date of Patent: Sep. 1, 2015

(54) CARGO BED SYSTEM FOR A VEHICLE (71) Applicants: Michael C Gillam, Addison Township, MI (US); Joseph S Dehner, Bloomfield Hills, MI (US)

(72) Inventors: Michael C Gillam, Addison Township, MI (US); Joseph S Dehner, Bloomfield Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/276,149

(22) Filed: May 13, 2014

(51) Int. Cl.
  *B62D 25/00* (2006.01)
  *B62D 33/033* (2006.01)
  *B60R 9/02* (2006.01)

(52) U.S. Cl.
  CPC ................ *B62D 33/033* (2013.01); *B60R 9/02* (2013.01)

(58) Field of Classification Search
  CPC .............................. B60R 9/02; B62D 33/033
  USPC .......................... 296/37.1, 82, 37.6, 186.5, 29
  See application file for complete search history.

(56) References Cited

U.S. PATENT DOCUMENTS

| | | | |
|---|---|---|---|
| 4,938,398 A | 7/1990 | Hallsen | |
| 5,169,200 A | 12/1992 | Pugh | |
| 5,228,742 A * | 7/1993 | Johnson et al. | 296/191 |
| 5,567,000 A | 10/1996 | Clare | |
| 5,615,922 A | 4/1997 | Blanchard | |
| 5,784,769 A | 7/1998 | Clare | |
| 5,819,390 A | 10/1998 | Clare | |
| 5,823,598 A | 10/1998 | Clare et al. | |
| 5,979,617 A | 11/1999 | Clare et al. | |
| 5,979,973 A | 11/1999 | Clare et al. | |
| 6,003,923 A | 12/1999 | Scott et al. | |
| 6,007,130 A | 12/1999 | Clare et al. | |
| 6,012,754 A | 1/2000 | Clare et al. | |
| 6,030,018 A | 2/2000 | Clare et al. | |
| 6,033,002 A | 3/2000 | Clare et al. | |
| 6,036,258 A | 3/2000 | Clare et al. | |
| 6,089,639 A | 7/2000 | Wojnowski | |
| 6,105,231 A | 8/2000 | Clare et al. | |
| 6,129,401 A | 10/2000 | Neag et al. | |
| 6,142,549 A | 11/2000 | Clare et al. | |
| 6,224,138 B1 | 5/2001 | Adsit et al. | |
| 6,237,211 B1 | 5/2001 | Clare et al. | |
| 6,499,795 B2 | 12/2002 | Clare | |
| 6,814,397 B2 * | 11/2004 | Henderson et al. | 296/184.1 |
| 6,966,593 B2 | 11/2005 | Plentis et al. | |
| 7,104,583 B2 | 9/2006 | Clare | |
| 7,413,231 B1 | 8/2008 | Wood et al. | |
| 7,651,146 B2 * | 1/2010 | Anderson et al. | 296/37.6 |
| 7,686,365 B2 * | 3/2010 | Thelen et al. | 296/37.6 |
| 7,722,111 B2 * | 5/2010 | Reich et al. | 296/183.1 |
| 7,828,356 B2 | 11/2010 | Wood et al. | |
| 2001/0013709 A1 | 8/2001 | Clare et al. | |
| 2001/0038217 A1 | 11/2001 | Clare et al. | |
| 2001/0038218 A1 | 11/2001 | Clare et al. | |
| 2001/0038219 A1 | 11/2001 | Clare et al. | |
| 2001/0038230 A1 | 11/2001 | Clare et al. | |
| 2001/0050491 A1 | 12/2001 | Clare et al. | |
| 2013/0270854 A1 | 10/2013 | Weller | |
| 2014/0021232 A1 * | 1/2014 | Lazarevich et al. | 224/539 |

* cited by examiner

*Primary Examiner* — Pinel Romain
(74) *Attorney, Agent, or Firm* — Ralph E Smith (57) ABSTRACT

A cargo bed system for a motor vehicle includes a bed frame, a side frame member, a storage module and a non-storage module. The bed frame has a floor, a forward wall, a pair of opposing sidewalls and a bed frame connection member formed on the bed frame. The side frame member has a side frame connection member that is configured to selectively mate with the bed frame connection member in an installed position. The bed frame is configured to selectively and alternatively receive (i) the side frame member and the storage module in a storage configuration or (ii) the side frame member and the non-storage module in a non-storage configuration.

16 Claims, 7 Drawing Sheets

CARGO BED SYSTEM FOR A VEHICLE

FIELD

The present disclosure relates generally to cargo beds on motor vehicles and, more particularly, to a modular cargo bed frame that alternately accepts a storage module or a non-storage module.

BACKGROUND

Motor vehicles such as pickup trucks include a bed for carrying cargo. Recent designs have also provided cargo storage space between a side panel and a wall of the cargo bed. Such cargo storage configurations provide receptacles that are suitable to store and secure smaller items of cargo. Some of these receptacles integrate a lockable lid. While these side panel storage receptacles are convenient, they are not always desired for every customer. In this regard, it is desirable to offer the option of a pickup truck cargo bed that includes a side panel storage receptacle and one that does not include such a receptacle.

While providing multiple cargo bed configurations for a customer is desirable, it is also desirable to incorporate a pickup truck cargo bed that can quickly and easily accommodate both scenarios during assembly.

SUMMARY

In one aspect, a cargo bed system for a vehicle is provided in accordance with the teachings of the present disclosure. In an exemplary implementation, the cargo bed system includes a bed frame, a side frame member, a storage module and a non-storage module. The bed frame has a floor, a forward wall, a pair of opposing sidewalls and a bed frame connection member formed on the bed frame. The side frame member has a side frame connection member that is configured to selectively mate with the bed frame connection member in an installed position. The side frame member comprises a side frame member mounting feature. The storage module includes a receptacle. The storage module has a storage module mounting feature. The non-storage module has a non-storage module mounting feature. The bed frame is configured to selectively and alternatively receive (i) the side frame member and the storage module in a storage configuration or (ii) the side frame member and the non-storage module in a non-storage configuration. In the storage configuration, the side frame member mounting feature is engaged with the storage module mounting feature. In the non-storage configuration, the side frame member mounting feature is engaged with the non-storage mounting feature.

According to additional features, the bed frame connection member is formed on one of the opposing sidewalls of the pair of opposing sidewalls. In an exemplary implementation, the bed frame connection member includes one of a peg and an aperture. The side frame member connection member comprises the other of the peg and the aperture. The aperture is configured to receive a corresponding peg in the installed position. The bed frame connection member comprises a plurality of bed frame apertures and bed frame pegs. The side frame connection member comprises a corresponding plurality of side frame connection member apertures and side frame connection member pegs. The corresponding apertures are configured to receive the corresponding pegs in the installed position.

According to still additional features, the pegs and apertures cooperate to inhibit relative movement of the side frame connection member and the bed frame in the installed position. In an exemplary implementation, the side frame member mounting feature comprises a passage and the storage module mounting feature comprises a storage mounting aperture. The passage and the storage mounting aperture are configured to align and receive a fastener in an assembled storage configuration. The non-storage module mounting feature comprises a non-storage mounting aperture. The passage and the non-storage mounting aperture are configured to align and receive a fastener in an assembled non-storage configuration. The storage module further comprises a lid that moves between an open and closed position to provide access to the receptacle. The forward wall defines forward wall apertures that are configured to align with side frame apertures defined in the side frame member. The forward wall apertures and the side frame apertures are configured to receive a fastener in the installed position. The cargo bed system further comprises a cargo bed body panel that is configured to be coupled to the side frame member.

In another aspect, a cargo bed system for a vehicle is provided in accordance with the teachings of the present disclosure. In an exemplary implementation, the cargo bed system comprises a bed frame, a storage module and a non-storage module. The bed frame has a floor, a forward wall, a pair of opposing sidewalls and a bed frame connection member formed on the bed frame. The storage module includes a receptacle. The bed frame is configured to selectively and alternatively receive (i) the storage module in a storage configuration, or (ii) the non-storage module in a non-storage configuration.

In one example, the storage module includes a storage module connection member that is engaged with the bed frame connection member in the storage configuration. The non-storage module includes a non-storage module connection member that is engaged with the bed frame connection member in the non-storage configuration.

In another example, the cargo bed system further includes a side frame member having a side frame connection member that is configured to selectively mate with the bed frame connection member in an installed position. The side frame member further comprises a side frame member mounting feature. The storage module includes a storage module mounting feature. The non-storage module includes a non-storage module mounting feature. The bed frame is configured to selectively and alternatively receive (i) the side frame member and the storage module in the storage configuration, the side frame member mounting feature engaged with the storage module mounting feature; and (ii) the side frame member and the non-storage module in the non-storage configuration, the side frame member mounting feature engaged with the non-storage mounting feature.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
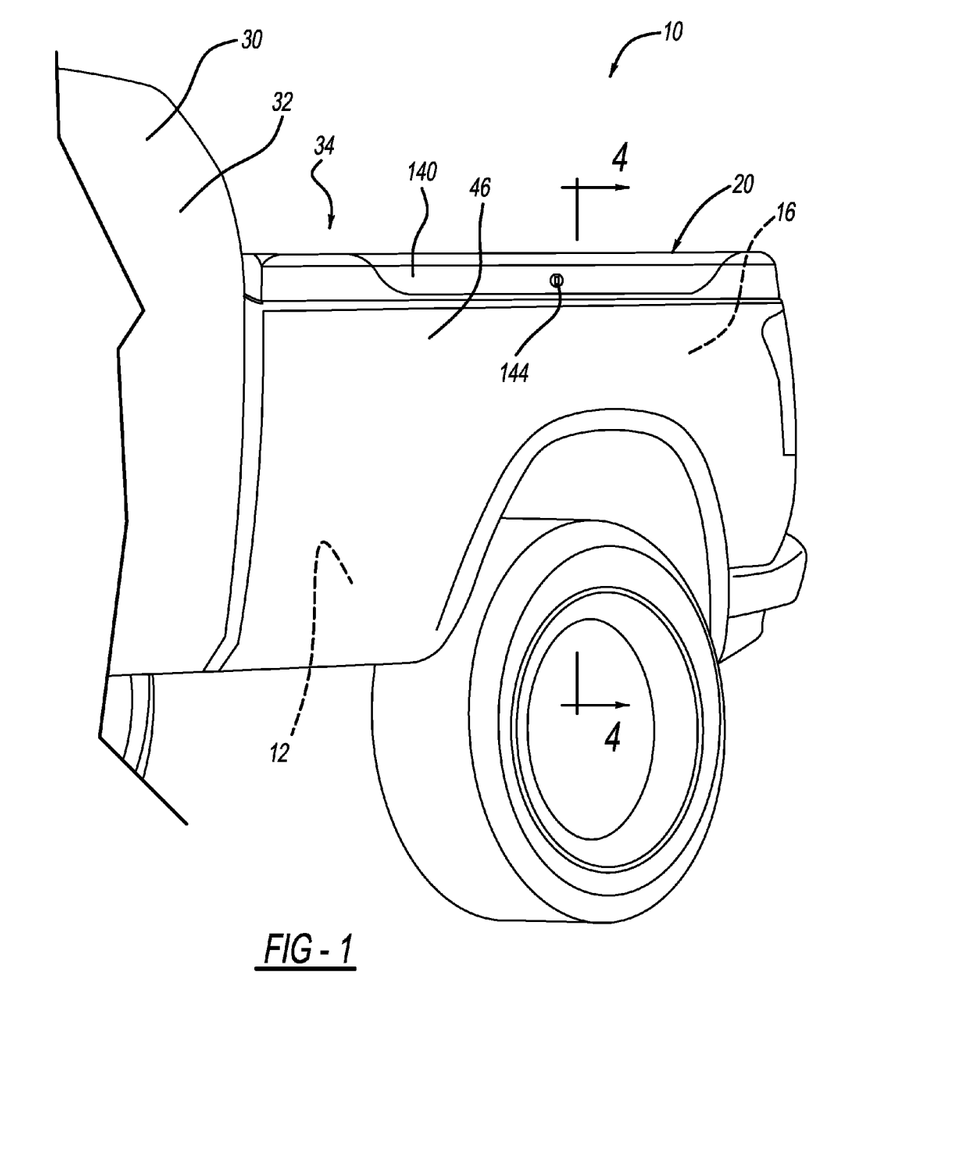
FIG. 1 is a side perspective view of a cargo bed system according to the principles of the present disclosure and shown in a storage configuration.
Figure 2:
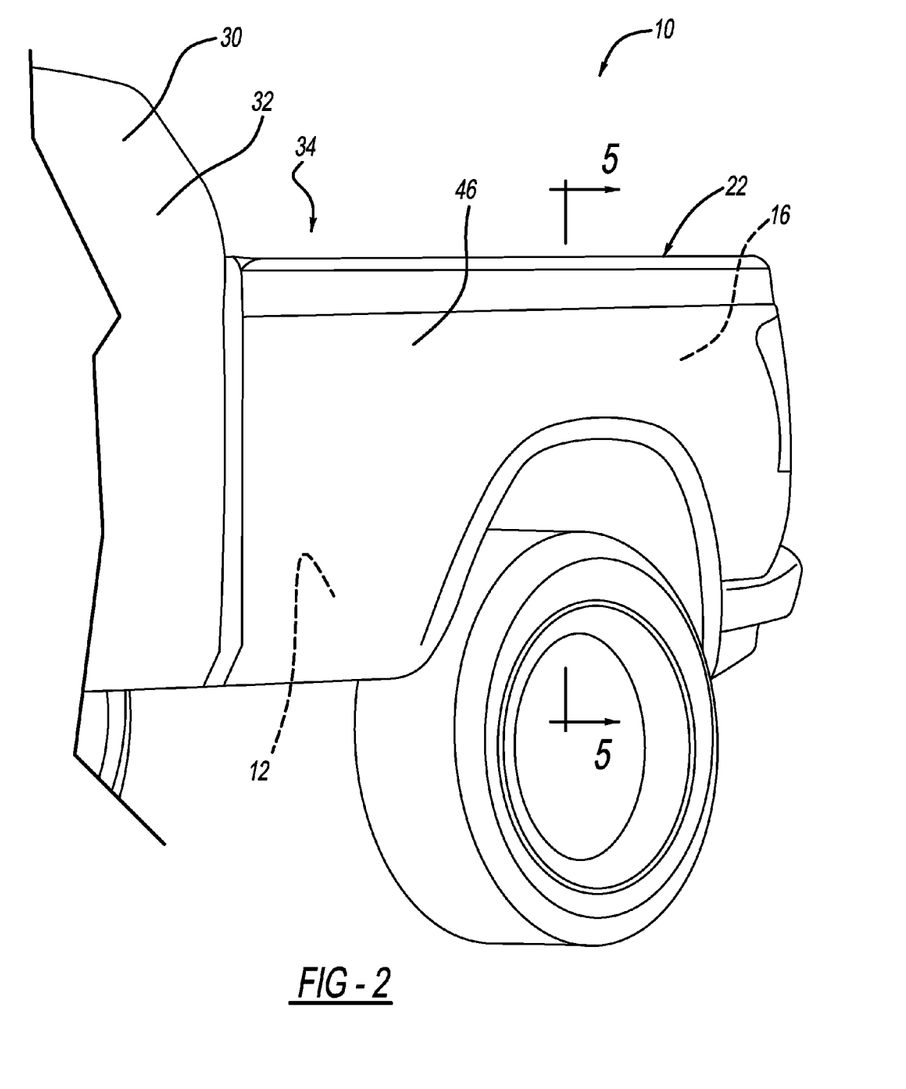
FIG. 2 is a side perspective view of the cargo bed system according to the principles of the present disclosure and shown in a non-storage configuration.

With initial reference to FIGS. 1 and 2, a cargo bed system for a motor vehicle is shown and generally identified at reference numeral 10. In general, in the example illustrated, the cargo bed system 10 includes a bed frame 12, a side frame member 16 (see also FIGS. 3A and 3B), a storage module 20 (FIG. 1) and a non-storage module 22 (FIG. 2). As will become appreciated from the following discussion, the cargo bed system 10 provides a modular bed frame 12 that is configured to selectively and alternatively be assembled for use with the storage module 20 (FIG. 1) in a storage configuration or for use with a non-storage module (FIG. 2) in a non-storage configuration. In this regard, a common bed frame 12 may be utilized for two distinct set-up scenarios. This modularity offers efficiencies during assembly and reduced component requirements. In the examples shown in FIGS. 1 and 2, the modular bed frame 12 is used together with the side frame member 16 for both of the storage configuration (FIG. 1) and the non-storage configuration (FIG. 2). Using a modular bed frame provides efficiencies during assembly and eliminates the need to provide distinct bed frames and side frame members for motor vehicles being assembled in the storage configuration or the non-storage configuration.

The cargo bed system 10 is shown as part of a motor vehicle 30. In the example shown, the motor vehicle 30 is a pickup truck however the cargo bed system 10 may be configured for use with other vehicles that incorporate storage beds or cargo areas in general. The motor vehicle 30 generally includes a cabin 32 and a cargo bed 34. The cabin 32 surrounds occupants of the motor vehicle 30 and occupies an area in front of the cargo bed 34.

The cargo bed 34 is generally provided by the bed frame 12 and includes a forward wall 38, a floor 40, a pair of sidewalls 42 and a rear wall 44. The motor vehicle 30 also includes a cargo bed body panel 46 that is configured to be coupled to the side frame member 16. In one exemplary implementation, the rear wall 44 is a folding tailgate that rotates between an upright stowed position and a generally horizontal access position. In the upright stowed position, the folding tailgate selectively locks relative to the sidewalls 42. In the Figures shown and description set forth herein, focus will be given to one of the pair of sidewalls 42 and a corresponding side frame member 16 and storage module 20 or non-storage module 22. It will be appreciated however that the same features and principles are equally applicable to the sidewall 42 on the opposite side of the motor vehicle 30. In this regard, while description is given to assembling one side of the cargo bed 34 for use in a storage configuration with the storage module 20 or use in a non-storage configuration with the non-storage module 22, the opposite side of the cargo bed 34 may additionally or alternatively be configured similarly.

Figure 3A:
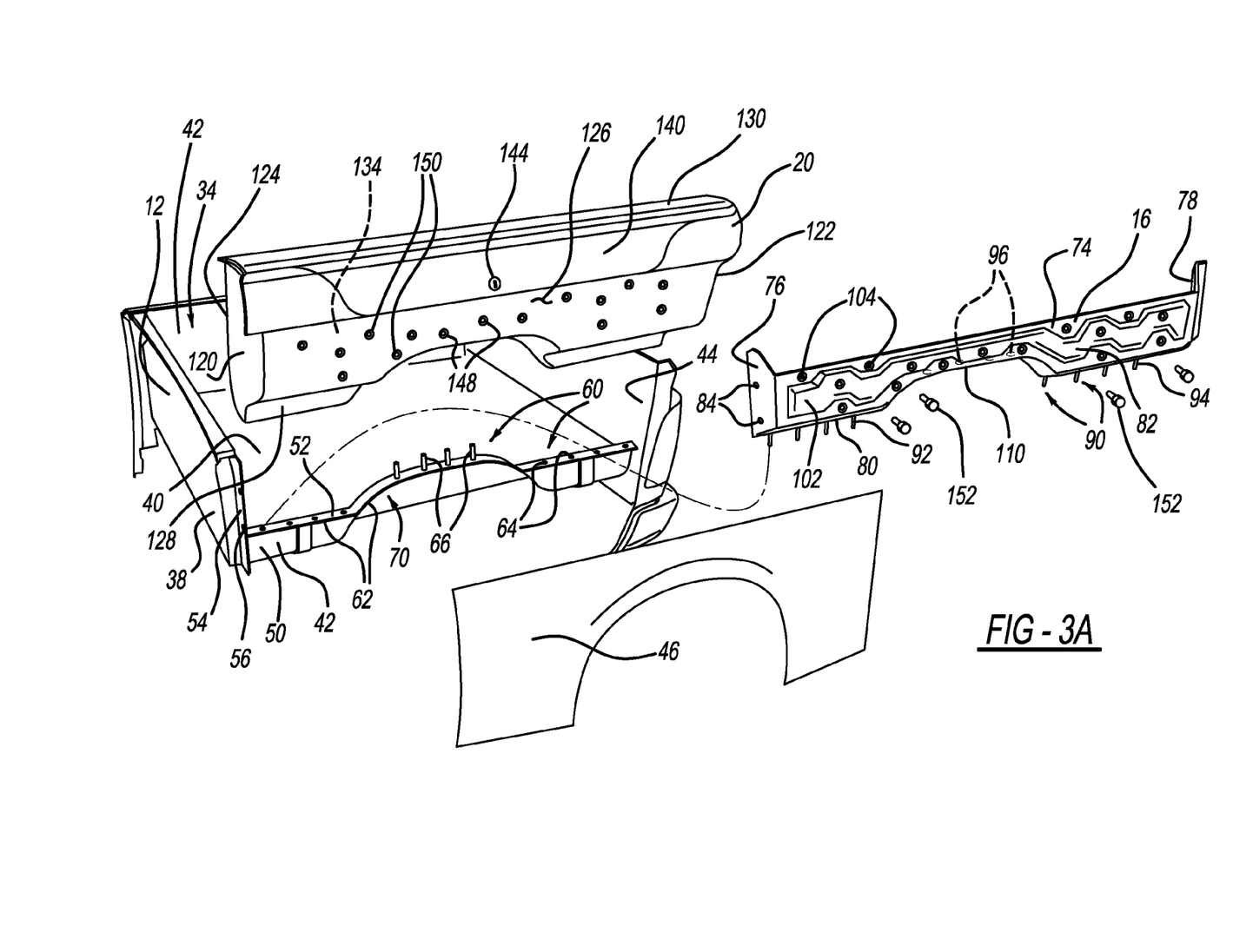
FIG. 3A is an exploded side perspective view of the cargo bed system according to the principles of the present disclosure and shown with a storage module selected for assembly.
Figure 3B:
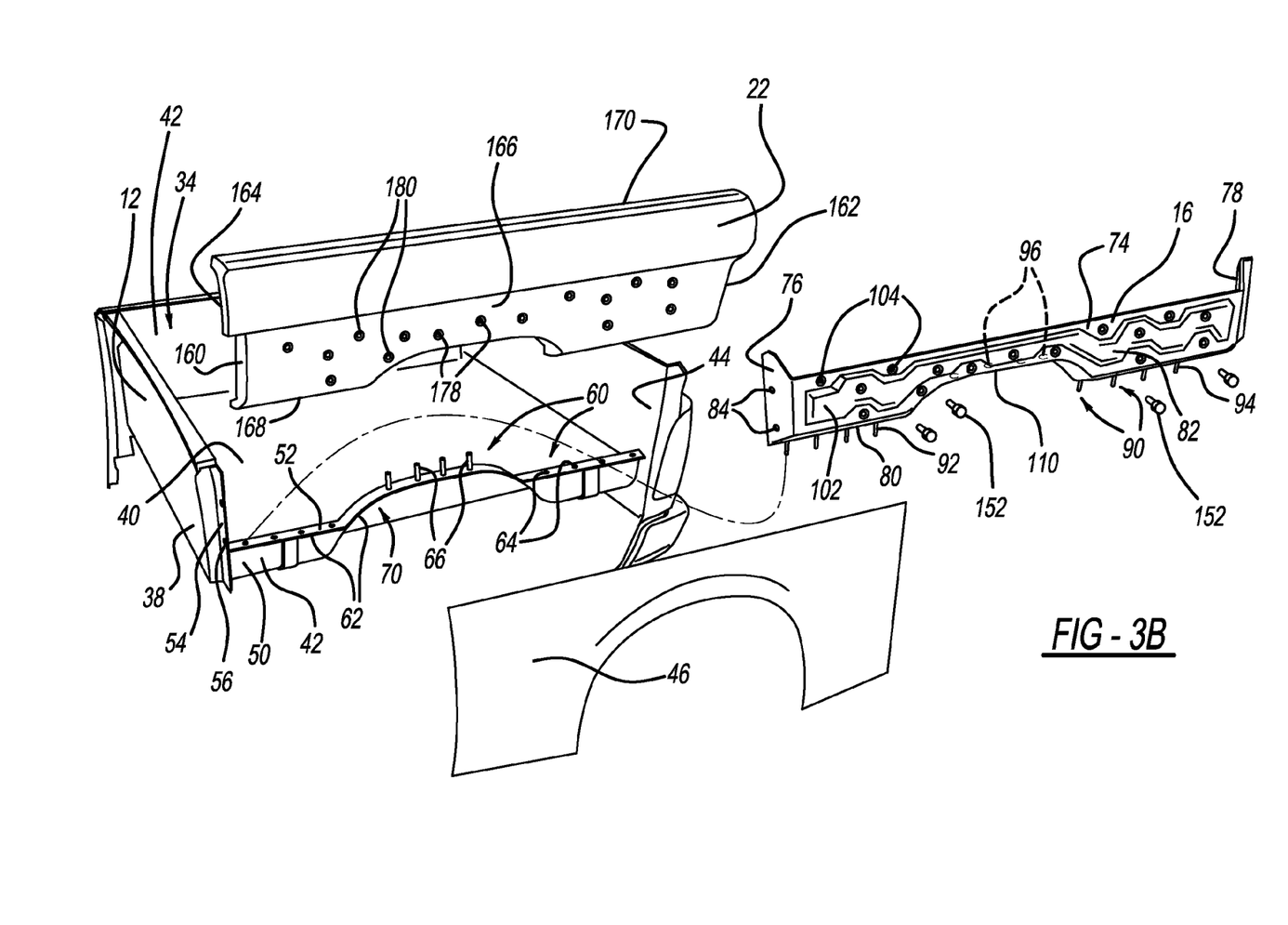
FIG. 3B is an exploded side perspective view of the cargo bed system according to the principles of the present disclosure and shown with a non-storage module selected for assembly.

With particular reference now to FIGS. 3A and 3B, the bed frame 12 will be described in greater detail. As identified above, the bed frame 12 is modular and suitable to be used in either of the storage configuration (FIGS. 1 and 3A) and the non-storage configuration (FIGS. 2 and 3B). The bed frame 12 generally includes rails 50 incorporated in the sidewalls 42. The rails 50 incorporate corresponding side flanges 52 thereon. The forward wall 38 provides forward flanges 54. The forward flanges 54 incorporate forward flange apertures 56.

The bed frame 12 provides a plurality of bed frame connection members 60 thereon. In the example provided, the bed frame connection members 60 include a front series of apertures 62, a rear series of apertures 64 and an intermediate series of studs or pegs 66. The pegs 66 are arranged around a wheel well region 70 of the bed frame 12 while the front series of apertures 62 are located forward of the wheel well region 70 and the rear series of apertures 64 are located rearward of the wheel well region 70. It will be appreciated, however, that the locations of the respective front and rear series of apertures 62 and 64 and the pegs 66 is exemplary. In this regard, apertures may be provided at locations where the pegs 66 are shown while pegs 66 may be provided at locations where the apertures 62, 64 are shown. Alternatively, pegs and apertures may be alternately or randomly arranged along the rail 50. It will be further appreciated that while the connection members 60 have been described and shown as apertures and pegs, other fasteners or structures may be incorporated for selectively coupling with the side frame member 16.

The side frame member 16 will now be described in greater detail. In one exemplary implementation, the side frame member 16 generally includes a frame structure 74 having a forward wall 76, a rearward wall 78, a lower wall 80 and a side wall 82. The forward wall 76 includes forward wall apertures 84 that cooperatively align with the forward flange apertures 56. Fasteners (not specifically shown) are advanced through the forward wall apertures 84 and the forward flange apertures 56 in an assembled position. The side frame member 16 includes side frame connection members 90 arranged thereon. In the example shown, the side frame connection members 90 are provided on the lower wall 80.

The side frame connection members 90 include a front series of pegs 92, a rear series of pegs 94 and an intermediate series of apertures 96. As can be appreciated, the front series of pegs 92 are configured to be received by the front series of apertures 62 on the rail 50 of the bed frame 12. The rear series of pegs 94 are configured to be received by the rear series of apertures 64 on the rail 50 of the bed frame 12. The intermediate series of apertures 96 are configured to receive the intermediate series of pegs 66 on the rail 50 of the bed frame 12. Again, the locations and configurations of the respective apertures and pegs is exemplary and may be altered to be complementary to the configuration of the mating bed frame connection member 60 provided on the bed frame 12. Further, it will be appreciated that other structures may be additionally or alternatively provided for the bed frame connections members 60 and side frame connection members 90 such as, but not limited to, push pins, tabs, bolts, threaded fasteners, clips, rivets, retaining rings, wedge anchors and the like.

In the exemplary implementation illustrated, the side wall 82 of the side frame member 16 includes a raised portion 102 and a plurality of side frame member mounting features 104.

The raised portion 102 provides structural strength to the side frame member 16. The plurality of side frame member mounting features 104 are shown in the form of corresponding side frame passages 110.

With specific reference now to FIGS. 1 and 3A, the storage module 20 will be described in greater detail. The storage module 20 generally includes a forward storage wall 120, a rearward storage wall 122, an inboard storage wall 124, an outboard storage wall 126, a bottom storage wall 128 and an upper storage wall 130. The forward storage wall 120, rearward storage wall 122, inboard storage wall 124, outboard storage wall 126, bottom storage wall and upper storage wall 130 collectively define a receptacle 134. In the example shown, a storage lid 140 is incorporated at the upper storage wall 130.

The storage lid 140 is hingedly coupled to a portion of the storage module 20 and rotatably moves between an open and closed position. In this regard, the storage lid 140 may be opened to gain access to the receptacle 134. A keyhole 144 is further provided on the storage lid 140 for locking the storage lid 140 in the closed position. A plurality of storage module mounting features 148 are arranged on the outboard storage wall 126. The plurality of storage module mounting features 148 are in the form of storage mounting apertures 150 and are provided at locations to align with the passages 110 of the corresponding side frame mounting features 104 for receiving fasteners 152 in an assembled position.

With specific reference now to FIGS. 2 and 3B, the non-storage module 22 will be described in greater detail. In the example illustrated, the non-storage module 22 generally includes a forward wall 160, a rearward wall 162, an inboard wall 164, an outboard wall 166, a bottom wall 168 and an upper wall 170. The forward wall 160, the rearward wall 162, the inboard wall 164, outboard wall 166, bottom wall 168 and upper wall 170 collectively provide a filler or a blank to occupy a portion of the space otherwise occupied by the storage module 20. A plurality of non-storage module mounting features 178 are arranged on the outboard wall 166. The plurality of non-storage module mounting features 178 are in the form of non-storage mounting apertures 180 and are provided at locations to align with the passages 110 of the corresponding side frame mounting features 104 for receiving fasteners 152 in an assembled position.

Figure 4:
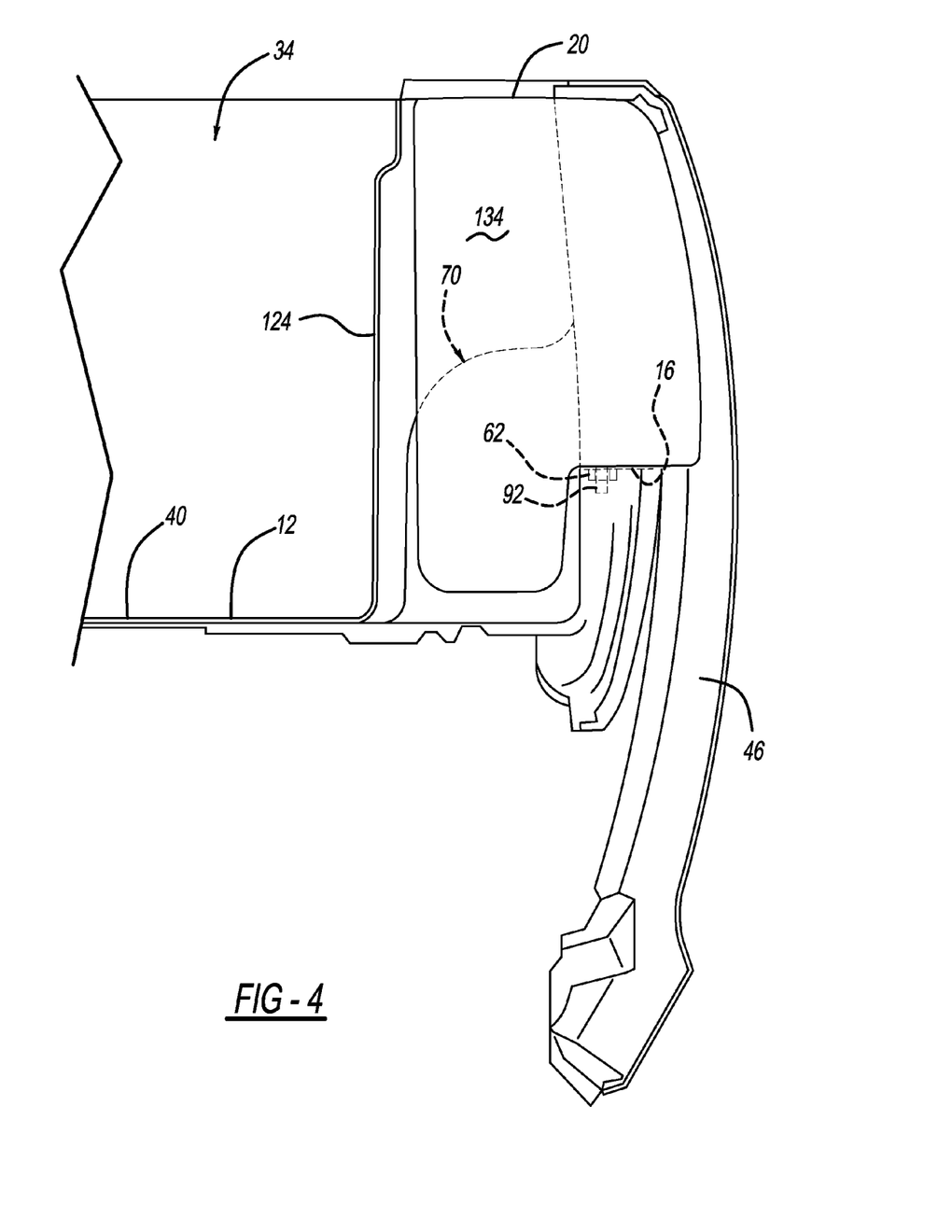
FIG. 4 is a cross-sectional view taken along lines 4-4 of FIG. 1 of the cargo bed system shown in the storage configuration.
Figure 5:
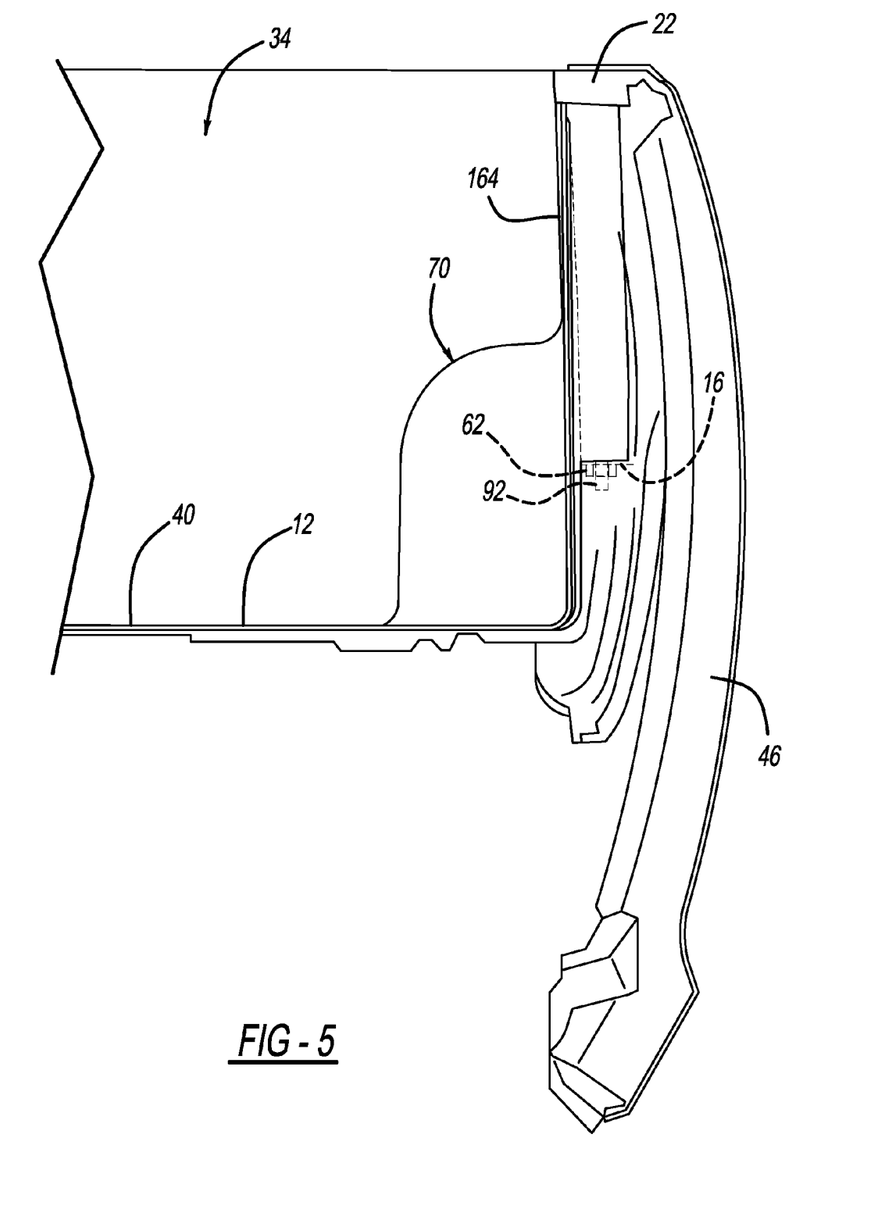
FIG. 5 is a cross-sectional view taken along lines 5-5 of FIG. 2 of the cargo bed system shown in the non-storage configuration.

With reference now to FIGS. 4 and 5, cross-sectional views taken through the cargo bed system 10 in the storage configuration (FIG. 4) and the non-storage configuration (FIG. 5) are shown. In the storage configuration (FIG. 4), the storage module 20 is shown assembled with the side frame member 16 and installed to the bed frame 12. As shown, one of the pegs 92 extending from the side frame member 16 is received by a complementary aperture 62 defined on the bed frame 12. In the non-storage configuration (FIG. 5), the non-storage module 22 is shown assembled with the side frame member 16 and installed to the bed frame 12. As shown, one of the pegs 92 extending from the side frame member 16 is received by a complementary aperture 62 defined on the bed frame 12. While the non-storage module 22 is shown extending inboard into the cargo bed 34 a reduced distance as compared to the storage module 20, the non-storage module 22 may be constructed differently so as to extend a similar distance inboard into the cargo bed 34 to match or substantially match a footprint of the storage module 20.

Figure 6:
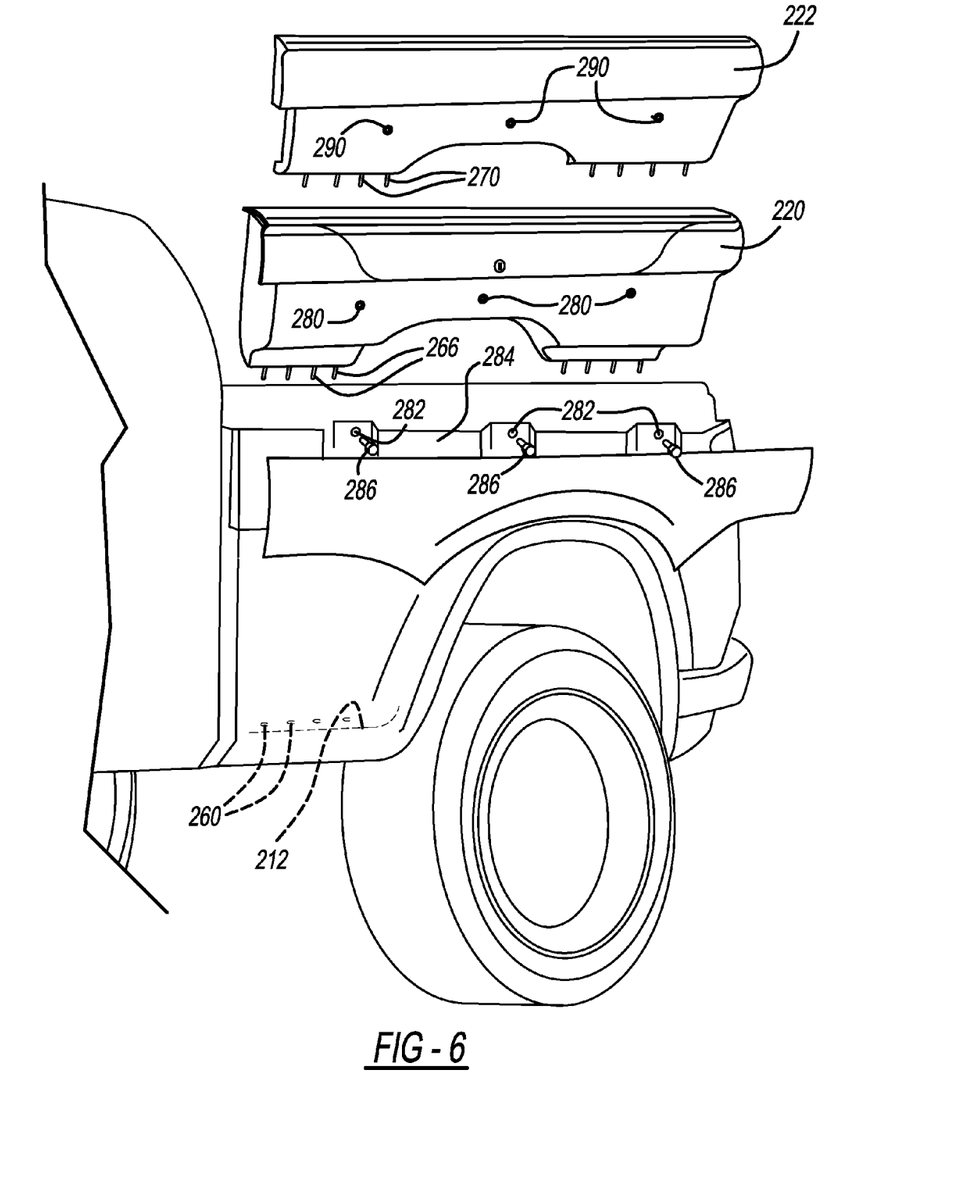
FIG. 6 is an exploded perspective view of a cargo bed system constructed in accordance to additional features of the present disclosure.

With reference now to FIG. 6, an exemplary cargo bed system constructed in accordance to additional feature of the present disclosure is shown and generally identified at reference numeral 210. In the example illustrated, the cargo bed system 210 is similar to the cargo bed system 10 described above with the following differences. The cargo bed system 210 does not incorporate a side frame member 16. Instead, the cargo bed system 210 includes a storage module 220 and a non-storage module 222. In this regard, the cargo bed system 210 provides a modular bed frame 212 that is configured to selectively and alternatively be assembly for use with the storage module 220 in a storage configuration or for use with the non-storage module 222 in a non-storage configuration. Explained further, the common bed frame 212 may be utilized for two distinct set-up scenarios.

In the configuration shown in FIG. 6, the modular bed frame 212 includes a plurality of bed frame connection members 260 that are configured to selectively and alternatively receive corresponding storage module connection members 266 or non-storage module connection members 270. The storage module 220 is otherwise constructed similarly to the storage module 20 described above. The storage module 220 includes outboard mounting apertures 280 configured to align with corresponding apertures 282 defined on sidewalls 284 of the bed frame 212. Fasteners 286 are advanced through the respective apertures 280 and 282 for further securing the storage module 220 to the bed frame 212. Other coupling devices may additionally or alternatively be used.

The non-storage module 222 is otherwise constructed similarly to the non-storage module 22 described above. The non-storage module 222 includes outboard mounting apertures 290 configured to align with the corresponding apertures 282 defined on the sidewall 284 of the bed frame 212. Fasteners 286, or other coupling devices, are advanced through the respective apertures 290 and 282 for further securing the non-storage module 222 to the bed frame 212.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A modular cargo bed system for a motor vehicle, the cargo bed system comprising:
   a bed frame having a floor, a forward wall, a pair of opposing sidewalls, and a bed frame connection member formed on the bed frame;
   a side frame member separate from the bed frame and having a side frame connection member that is complimentary to and configured to selectively mate with the bed frame connection member in an installed position, the side frame member further comprising a side frame member mounting feature;
   a storage module that includes a receptacle, the storage module having a storage module mounting feature; and
   a non-storage module having a non-storage module mounting feature;
   wherein the bed frame is configured to selectively receive one of:
   (i) the side frame member and the storage module in a storage configuration, with the side frame member mounting feature engaged with the storage module mounting feature and the side frame connection member engaged with the bedframe connection member in the installed position; and
   (ii) the side frame member and the non-storage module in a non-storage configuration, with the side frame member mounting feature engaged with the non-storage mounting feature and the side frame connection member engaged with the bedframe connection member in the installed position and;

wherein the side frame member is configured to selectively receive the storage module and the non-storage module without requiring modification of the side frame member, storage module and non-storage module mounting features.

2. The cargo bed system of claim 1 wherein the bed frame connection member is formed on one of the opposing sidewalls of the pair of opposing sidewalls.

3. The cargo bed system of claim 2 wherein the bed frame connection member includes one of a peg and an aperture.

4. The cargo bed system of claim 3 wherein the side frame member connection member comprises the other of the peg and the aperture, and wherein the aperture is configured to receive a corresponding peg in the installed position.

5. The cargo bed system of claim 2 wherein the bed frame connection member comprises a plurality of bed frame apertures and bed frame pegs and wherein the side frame connection member comprises a corresponding plurality of side frame connection member apertures and side frame connection member pegs, wherein the corresponding apertures are configured to receive the corresponding pegs in the installed position.

6. The cargo bed system of claim 5 wherein the respective pegs and apertures cooperate to inhibit relative movement of the side frame connection member and the bed frame in the installed position.

7. The cargo bed system of claim 1 wherein the side frame member mounting feature comprises a passage and wherein the storage module mounting feature comprises a storage mounting aperture, the passage and the storage mounting aperture configured to align and receive a fastener in an assembled storage configuration.

8. The cargo bed system of claim 7 wherein the non-storage module mounting feature comprises a non-storage mounting aperture, the passage and the non-storage mounting aperture configured to align and receive a fastener in an assembled non-storage configuration.

9. The cargo bed system of claim 1 wherein the storage module further comprises a lid that moves between an open and closed position to provide access to the receptacle.

10. The cargo bed system of claim 1 wherein the forward wall defines forward wall apertures that are configured to align with side frame apertures defined in the side frame member, the forward wall apertures and the side frame apertures configured to receive a fastener in the installed position.

11. The cargo bed system of claim 1, further comprising a cargo bed body panel configured to be coupled to the side frame member.

12. A cargo bed system for a motor vehicle, the cargo bed system comprising:

a bed frame having a floor, a forward wall, a pair of opposing sidewalls, and a bed frame connection member formed on the bed frame;

a side frame member having a side frame connection member that is configured to selectively mate with the bed frame connection member in an installed position, the side frame member further comprising a side frame member mounting feature;

a storage module that includes a receptacle and a storage module mounting feature; and a non-storage module that includes a non-storage module mounting feature;

wherein the bed frame is configured to selectively and alternatively receive:

(i) the side frame member and the storage module in a storage configuration, the side frame member mounting feature engaged with the storage module mounting feature; and (ii) the side frame member and the non-storage module in a non-storage configuration, the side frame member mounting feature engaged with the non-storage module mounting feature.

13. The cargo bed system of claim 12 wherein the bed frame connection member is formed on one of the opposing sidewalls of the pair of opposing sidewalls.

14. The cargo bed system of claim 13 wherein the bed frame connection member includes one of a peg and an aperture.

15. The cargo bed system of claim 12 wherein the storage module further comprises a lid that moves between an open and closed position to provide access to the receptacle.

16. The cargo bed system of claim 12 further comprising a cargo bed body panel configured to be coupled to the side frame member.

* * * * *